(12) United States Patent
Kim et al.

(10) Patent No.: US 9,483,181 B2
(45) Date of Patent: Nov. 1, 2016

(54) DATA STORAGE DEVICE AND OPERATING METHOD THEREOF

(71) Applicant: SK hynix Inc., Gyeonggi-do (KR)

(72) Inventors: Jin Woong Kim, Gyeonggi-do (KR); Byeong Gyu Park, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 14/667,357

(22) Filed: Mar. 24, 2015

(65) Prior Publication Data

US 2016/0170648 A1    Jun. 16, 2016

(30) Foreign Application Priority Data

Dec. 12, 2014  (KR) ........................ 10-2014-0179191

(51) Int. Cl.
*G06F 12/00*   (2006.01)
*G06F 3/06*    (2006.01)
*G06F 12/10*   (2016.01)

(52) U.S. Cl.
CPC ........... *G06F 3/0604* (2013.01); *G06F 3/0653* (2013.01); *G06F 3/0673* (2013.01); *G06F 12/1009* (2013.01); *G06F 2212/1041* (2013.01); *G06F 2212/657* (2013.01)

(58) Field of Classification Search
USPC ........................................................ 711/133
See application file for complete search history.

(56) References Cited

U.S. PATENT DOCUMENTS 9,026,716 B2 *  5/2015  Kang ................... G06F 12/0246
                                                      711/103

FOREIGN PATENT DOCUMENTS

KR   1020110132202   12/2011
KR   1020130051032    5/2013

* cited by examiner

*Primary Examiner* — Jared Rutz
*Assistant Examiner* — Hamdy S Ahmed
(74) *Attorney, Agent, or Firm* — IP & T Group LLP

(57) ABSTRACT

An operating method of a data storage device includes receiving a read request from a host device, and selectively collecting position information of read-requested data.

20 Claims, 11 Drawing Sheets

FIG.3
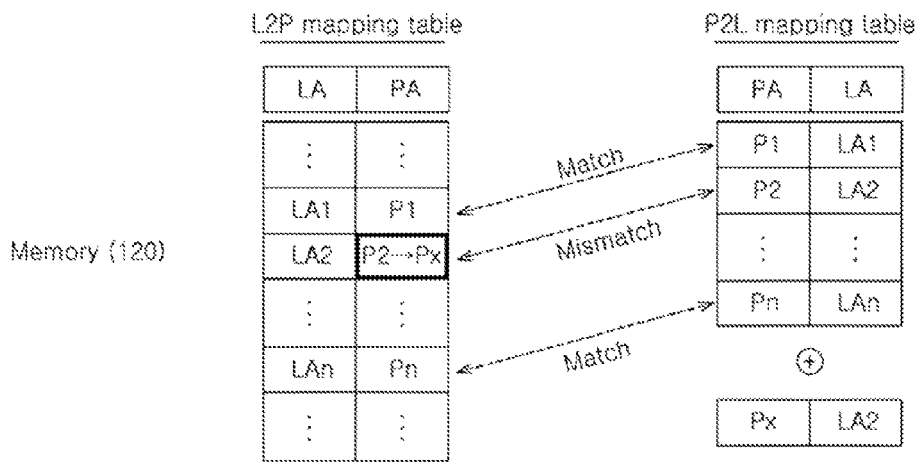
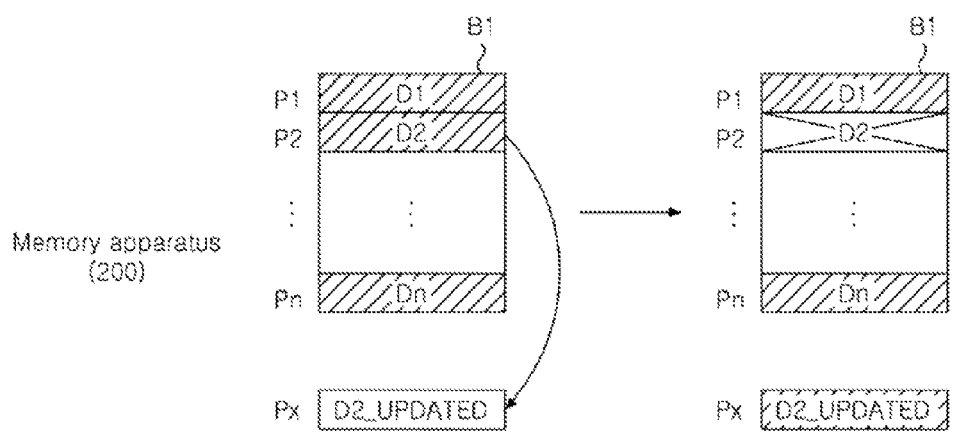

DATA STORAGE DEVICE AND OPERATING METHOD THEREOF

CROSS-REFERENCES TO RELATED APPLICATION

The present application claims priority under 35 U.S.C. §119(a) to Korean application number 10-2014-017919110, filed on Dec. 12, 2014, in the Korean Intellectual Property Office, which is incorporated herein by reference in its entirety.

BACKGROUND

1. Technical Field

Various embodiments generally relate to a data storage device and, more particularly, to a method of managing valid data thereof.

2. Related Art

Semiconductor apparatuses, specifically, semiconductor memory apparatuses, may be used to store data. Memory apparatuses may be divided into those that are volatile and nonvolatile.

Nonvolatile memory retains stored data even without a constant power source. Examples nonvolatile memory apparatus include flash memory, as NAND flash or NOR flash, FeRAM (ferroelectric random access memory), PCRAM (phase change random access memory), MRAM (magnetoresistive random access memory) or ReRAM (resistive random access memory).

Volatile memory, on the other hand, cannot retain stored data without a constant power source. Examples of volatile memory include SRAM (static random access memory) and DRAM (dynamic random access memory). Volatile memory is generally used as buffer memory, cache memory, working memory, or the like, in a data processing system, based on its relatively high processing speed.

SUMMARY

In an embodiment, an operating method of a data storage device may include receiving a read request from a host device, and selectively collecting position information of read-requested data.

In an embodiment, an operating method of a data storage device may include separately collecting position information of data read-requested from a host device, and performing a garbage collecting operation, based on collected position information.

In an embodiment, a data storage device may include: a nonvolatile memory apparatus including a plurality of memory blocks, and a controller suitable for selectively collecting position information of data read-requested from an external device to the nonvolatile memory apparatus.

BRIEF DESCRIPTION OF THE DRAWINGS

FIG. 3 is a diagram to assist in the explanation of a valid page and an invalid page.

DETAILED DESCRIPTION

Hereinafter, a data storage device and an operating method thereof will be described below with reference to the accompanying drawings through various exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can easily enforce the technical concepts of the present invention.

Figure 1:
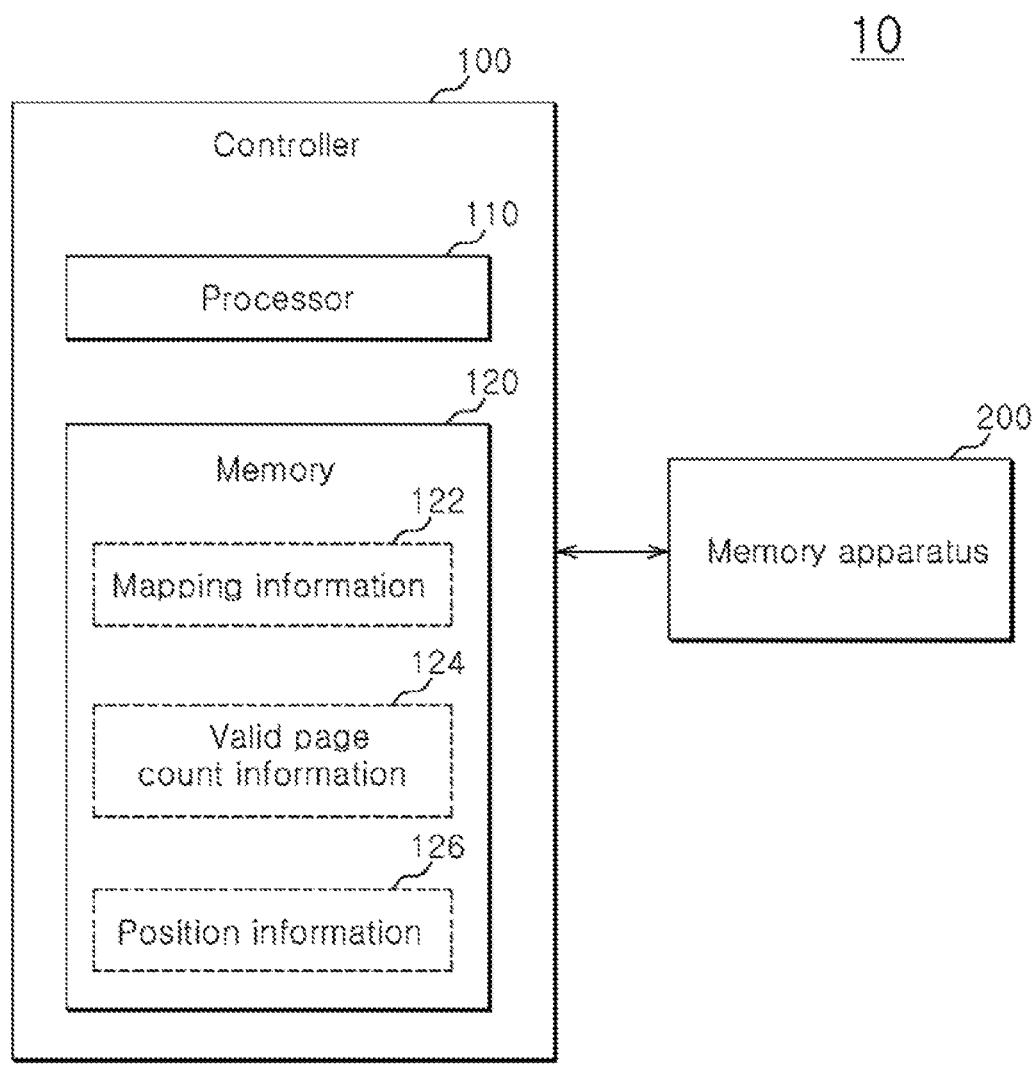
FIG. 1 is a block diagram schematically illustrating a data storage device in accordance with an embodiment.

FIG. 1 is a block diagram schematically illustrating a data storage device 10 in accordance with an embodiment.

The data storage device 10 may be configured to store the data provided from a host device (not shown), in response to a write request from the host device. Also, the data storage device 10 may be configured to provide stored data to the host device, in response to a read request from the host device. The host device is an electronic device capable of processing data and may include a computer, a digital camera or a mobile phone. The data storage device 10 may operate by being built in the host device, or may be manufactured separately and operate after being electrically coupled to the host device.

The data storage device 10 may be configured by a personal computer memory card international association (PCMCIA) card, a compact flash (CF) card, a smart media card, a memory stick, a multimedia card in the form of an MMC, an eMMC, an RS-MMC and an MMC-micro, a secure digital card in the form of an SD, a mini-SD and a micro-SD, a universal flash storage (UFS), or a solid state drive.

The data storage device 10 may include a controller 100 and a memory apparatus 200.

The controller 100 may include a processor 110 and a memory 120.

The processor 110 may control the general operations of the data storage device 10. The processor 110 may control the write operation or the read operation of the memory apparatus 200 in response to a write request or a read request from the host device. The processor 110 may generate commands for controlling the operations of the memory apparatus 200 and provide the generated commands to the memory apparatus 200. The processor 110 may drive a software program for controlling the operation of the data storage device 10, on the memory 120.

When storing data in the memory apparatus 200 in response to a write request, the processor 110 may generate mapping information 122 by matching the logical address included in the write request and the physical address of the memory apparatus 200. The processor 110 may manage the mapping information 122 in the form of an L2P mapping table and a P2L mapping table. The L2P mapping table may include the mapping information 122 in which logical addresses are set as indexes. The P2L mapping table may include the mapping information 122 in which physical addresses are set as indexes. The mapping information 122 may occupy a substantially large space in the memory 120 and, therefore, the processor 110 may back up the generated mapping information 122 in the memory apparatus 200, and refer to a necessary part of the backed-up mapping information 122 by loading it on the memory 120.

The processor 110 may manage information on the valid page count of each of the memory blocks included in the memory apparatus 200, as valid page count information 124. For example, a change in the mapping information 122 may lead to a change in the valid page count of a memory block. As will be described later in detail, the processor 110 may reflect the change in the valid page count on the valid page count information 124.

When a read request is received from the host device, the processor 110 may separately collect position information 126 of read-requested data. The position information 126 of read-requested data may indicate a position in the memory apparatus 200 where the read-requested data is stored. The position information 126 of read-requested data may include a physical address that is mapped by the logical address included in the read request. The processor 110 may refer to the mapping information 122 (for example, the L2P mapping table) to identify the position information 126 of read-requested data.

The processor 110 may selectively collect only position information 126 that satisfies a predetermined condition, based on the valid page count information 124. For example, the processor 110 may collect the position information 126 of read-requested data when the valid page count of a memory block, which stores the read-requested data, is equal to or smaller than a threshold. For another example, the processor 110 may select one or more inefficient blocks by referring to the valid page count information 124, and collect the position information 126 of read-requested data when a memory block, which stores the read-requested data, is included in the selected inefficient blocks.

As will be described later in detail, because the physical address mapped by the logical address included in the read request may be the address of a valid page in the L2P mapping table, the processor 110 may easily and immediately collect the address of a valid page as the position information 126 by referring to the logical address included in the read request and the mapping information 122 each time a read request is received. In order to efficiently perform a garbage collecting operation, the processor 110 may selectively collect the position information 126 for only an inefficient block, of which the valid page count is equal to or smaller than the threshold. According to the embodiment, a method for figuring out valid pages by collecting the position information 126 through actively utilizing the logical address included in a read request may considerably decrease the overhead of the processor 110 when compared to a method which will be described later with reference to FIG. 3.

The memory 120 may serve as the working memory, the buffer memory or the cache memory of the processor 110. The memory 120 as the working memory may store software programs and various program data to be driven by the processor 110. The memory 120 as the buffer memory may buffer data to be transmitted between the host device and the memory apparatus 200. The memory 120 as the cache memory may temporarily store cache data. The memory 120 may store the mapping information 122 and the valid page count information 124 that are to be referred to by the processor 110 and the position information 126, which is separately collected by the processor 110.

The memory apparatus 200 may be nonvolatile. For example, the memory apparatus 200 may be a flash memory apparatus such as a NAND flash or a NOR flash, an FeRAM (ferroelectric random access memory), a PCRAM (phase change random access memory), an MRAM (magnetoresistive random access memory) or an ReRAM (resistive random access memory). The memory apparatus 200 may store data according to the control of the processor 110. While it is illustrated in FIG. 1 that the data storage device 10 includes one memory apparatus 200, it is to be noted that the number of memory apparatuses included in the data storage device 10 is not specifically limited.

Figure 2:
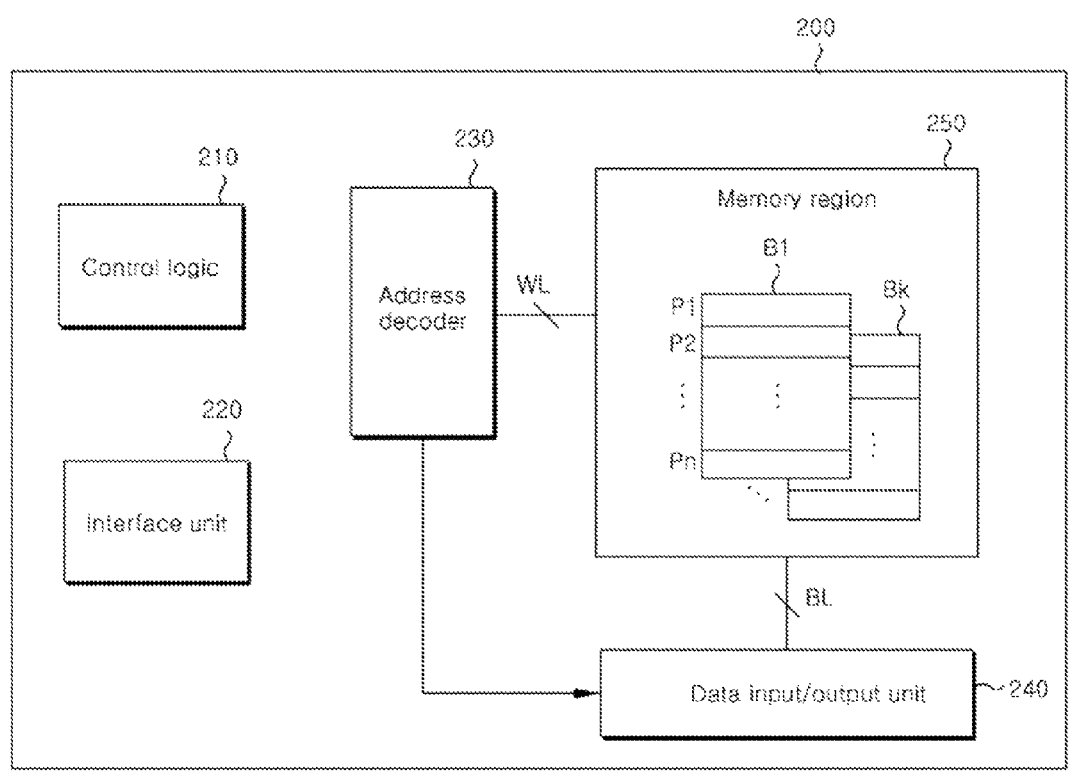
FIG. 2 is a block diagram illustrating an example of the memory apparatus shown in FIG. 1.

FIG. 2 is a block diagram illustrating an example of the memory apparatus 200 shown in FIG. 1.

The memory apparatus 200 may include a control logic 210, an interface unit 220, an address decoder 230, a data input/output unit 240, and a memory region 250.

The control logic 210 may control the general operations of the memory apparatus 200 such as a write operation, a read operation and an erase operation, in response to the commands provided from the controller 100.

The interface unit 220 may exchange various control signals including commands and addresses and data with the controller 100. The interface unit 220 may transmit the various control signals and the data inputted thereto, to the internal units of the memory apparatus 200.

The address decoder 230 may decode the row addresses and the column addresses transmitted thereto. The address decoder 230 may control word lines WL to be selectively driven based on the decoding results of the row addresses. The address decoder 230 may control the data input/output unit 240 to selectively drive bit lines BL based on the decoding results of the column addresses.

The data input/output unit 240 may transmit the data transmitted from the interface unit 220, to the memory region 250, through the bit lines BL. The data input/output unit 240 may transmit the data read through the bit lines BL from the memory region 250, to the interface unit 220.

The memory region 250 may be electrically coupled with the address decoder 230 through the word lines WL, and may be electrically coupled with the data input/output unit 240 through the bit lines BL. The memory region 250 may include a memory cell array of, for example, a three-dimensional structure.

The memory region 250 may include a plurality of memory cells (not shown) which are respectively disposed at areas where the word lines WL and the bit lines BL cross each other. The memory cells may be divided based on the number of data bits stored in each memory cell. For example, the memory cells may be divided into single level cells, each of which stores 1 bit, and multi-level cells, each of which stores at least 2 bits.

The memory region 250 may include a plurality of memory blocks B1 to Bk. Each of the memory blocks B1 to Bk may include a plurality of pages, for example, P1 to Pn. The memory apparatus 200 may perform an erase operation on a basis of memory blocks. The memory apparatus 200 may perform a write operation or a read operation on a basis of pages. That is, the erase operation is performed on each memory block and the write and read operations are performed on each page, as a basic unit.

FIG. 3 a diagram to assist in the explanation of a valid page and an invalid page. Referring to FIG. 3, there is an L2P mapping table and a P2L mapping table that are stored in the memory 120 and the memory block B1 of the memory apparatus 200, in which data D1 to Dn are stored in the respective pages P1 to Pn.

As described above, the processor 110 may generate mapping information by matching a logical address LA and a physical address PA when storing the data D1 to Dn in the respective pages P1 to Pn in response to a write request, and manage the mapping information in the form of the L2P and P2L mapping tables. At this time, the mapping information of the P2L and L2P mapping tables may correspond to each other.

Thereafter, when updating data, for example, the data D2, in response to a request from the host device, the processor 110 may store the data D2 in a new region, for example, a page Px. The processor 110 may generate mapping information by matching a logical address LA2 and a physical address Px in the P2L mapping table, and retain mapping information for a physical address P2. The processor 110 may reflect the latest state by updating mapping information for the logical address LA2 in the L2P mapping table.

In this case, the mapping information of the P2L mapping table and the mapping information of the L2P mapping table correspond to each other, for a valid page that stores valid data, and the mapping information of the P2L mapping table and the mapping information of the L2P mapping table do not correspond to each other, for an invalid page that stores invalid data. For example, the mapping information of the P2L and L2P mapping tables for the pages P1 and Pn still correspond to each other and, accordingly, the pages P1 and Pn may be valid pages. For example, since mapping information for the page P2 has been updated, the mapping information of the P2L and L2P mapping tables does not correspond and, accordingly, the page P2 may be an invalid page.

At a certain time, the processor 110 may figure out a valid page by comparing the mapping information of the P2L and L2P mapping tables and determining whether the mapping information corresponds, as described above. The process, in which the processor 110 loads the P2L and L2P mapping tables on the memory 120 and compares mapping information for each of all pages in the P2L and L2P mapping tables to figure out a valid page, may increase the overhead of the processor 110.

According to an embodiment, by immediately collecting the position information 126 of read-requested data upon each read request by referring to the L2P mapping table, which always reflects the latest mapping information, it is possible to effectively figure out a valid page. In detail, the position information 126 of read-requested data, that is, the physical address mapped by the logical address included in the read request, in the L2P mapping table, may indicate a valid page.

Also, according to an embodiment, by selectively collecting only position information for a memory block of which the valid page count is equal to or smaller than a threshold, it is possible to effectively save the cost of a garbage collecting operation. In the case where collection of position information for a memory block of which valid page count is equal to or smaller than the threshold is completed, the corresponding memory block may be selected as a victim block. A valid page may be easily figured out through the collected position information, and the garbage collecting operation may be efficiently performed.

Meanwhile, the processor 110 may manage the valid page count information 124 through management of the mapping information 122. For example, in FIG. 3, the processor 110 may set the valid page count of the memory block B1 to n from after the data D1 to Dn are stored in the pages P1 to Pn until certain mapping information is changed. The processor 110 may change the valid page count of the memory block B1 to n−1 when updating mapping information for the page P2.

Figure 4:
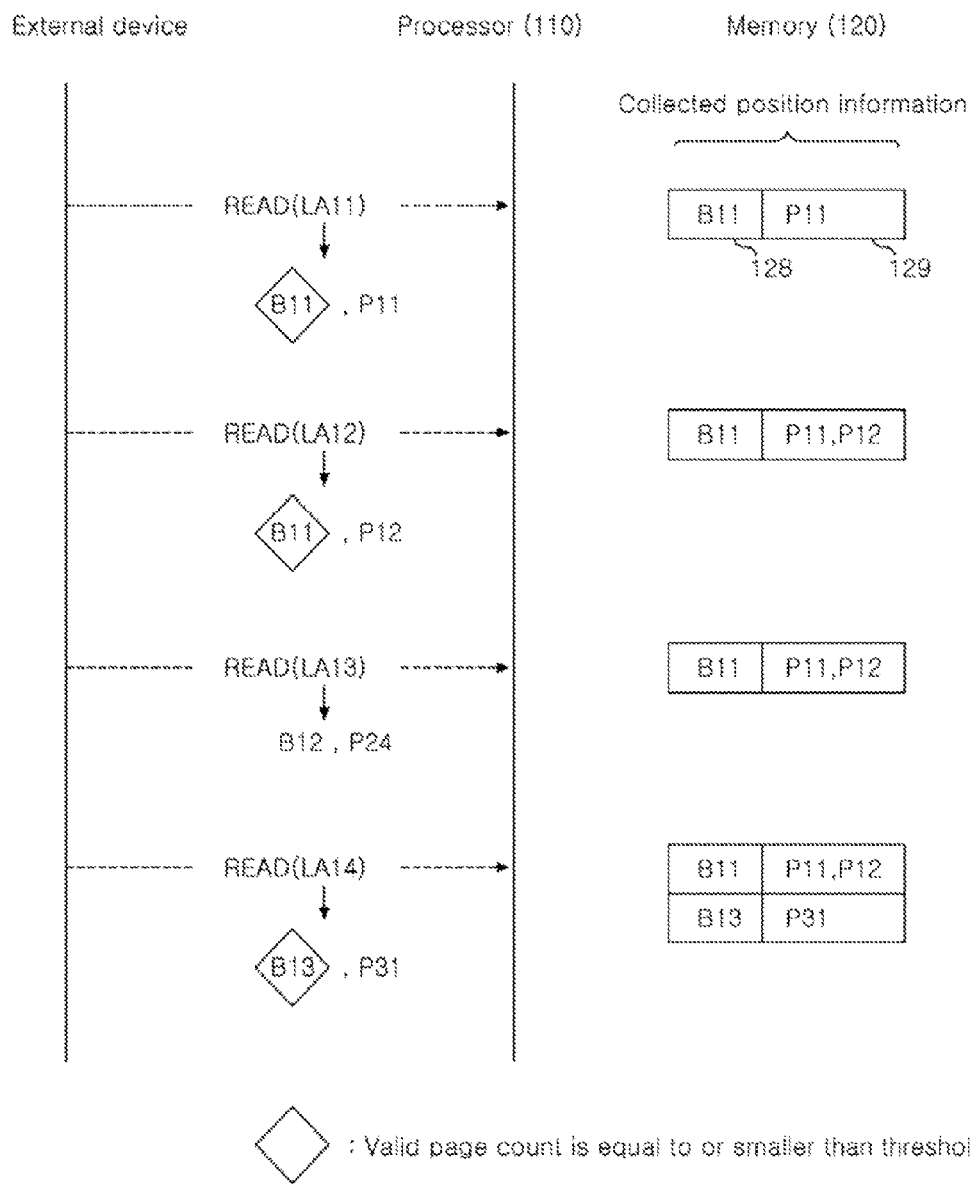
FIG. 4 is a diagram to assist in the explanation of an operating method of the data storage device shown in FIG. 1.

FIG. 4 is a diagram to assist in the explanation of an operating method of the data storage device 10 shown in FIG. 1. Referring to FIG. 4, a process for the processor 110 to selectively collect the position information 126 of read-requested data, based on the read request provided from the host device, is shown as an example.

When a read request for a logical address LA11 is received, the processor 110 may check that the valid page count of a memory block B11, mapped by the logical address LA11, is equal to or smaller than the threshold, and collect the physical address mapped by the logical address LA11, that is, position information B11 and P11 of read-requested data. The collecting region of the memory 120 may include, for example, a region 128 for storing the address of a memory block B11 and a region 129 for storing the address of a page P11.

When a read request for a logical address LA12 is received, the processor 110 may check if the valid page count of the memory block B11, mapped by the logical address LA12, is equal to or smaller than the threshold, and collect the physical address mapped by the logical address LA12, that is, position information B11 and P12 of read-requested data.

When a read request for a logical address LA13 is received, the processor 110 may check that the valid page count of a memory block B12, mapped by the logical address LA13, exceeds the threshold, and not collect the physical address mapped by the logical address LA13, that is, position information B12 and P24 of read-requested data.

When a read request for a logical address LA14 is received, the processor 110 may check that the valid page count of a memory block B13, mapped by the logical address LA14, is equal to or smaller than the threshold, and collect the physical address mapped by the logical address LA14, that is, position information B13 and P31 of read-requested data.

Figure 5A:
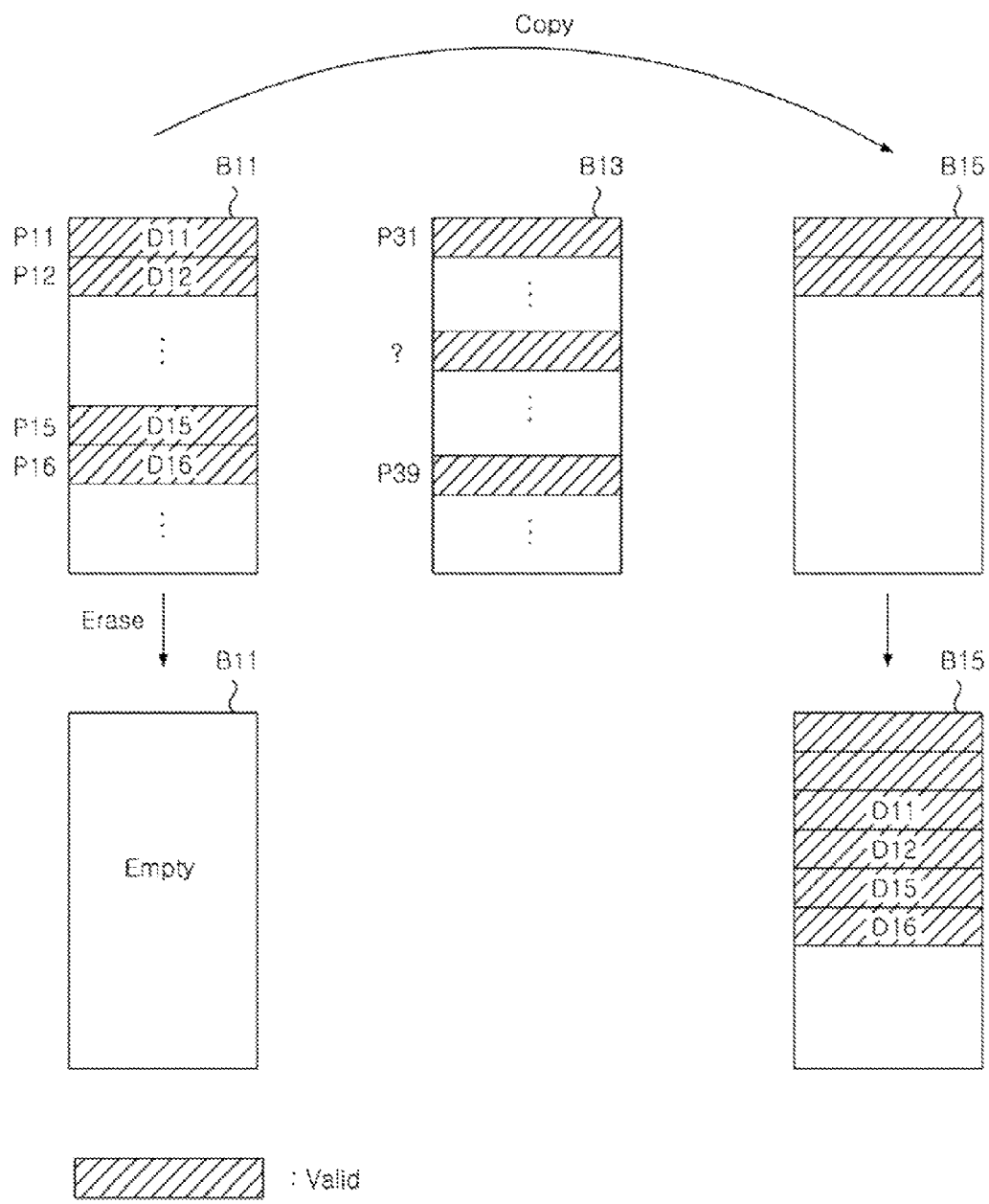
FIGS. 5A and 5B are diagrams to assist in the explanation of a method for the processor, shown in FIG. 1, to utilize collected position information.
Figure 5B:
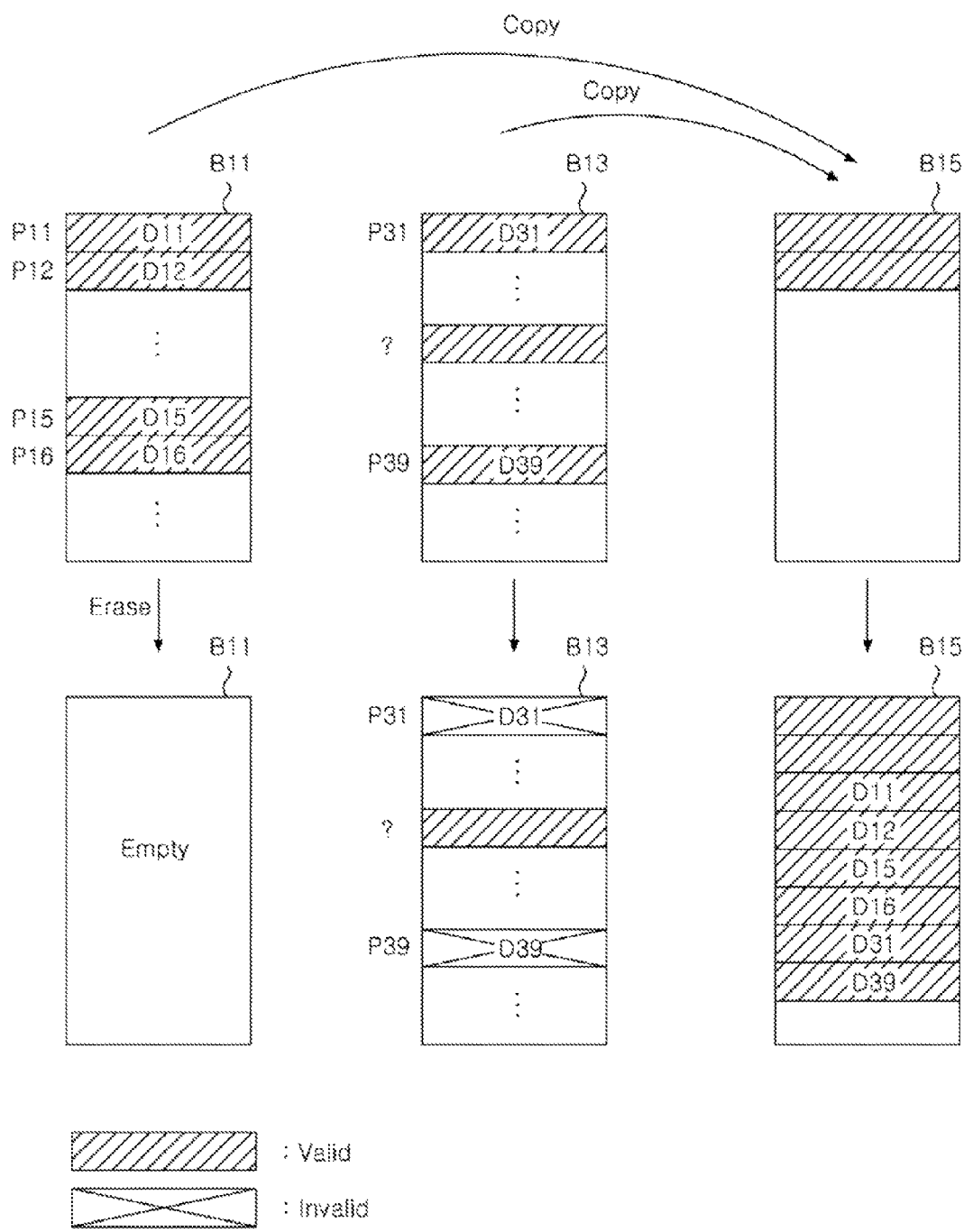

FIGS. 5A and 5B are diagrams to assist in the explanation of a method for the processor 110, shown in FIG. 1, to utilize collected position information. In FIGS. 5A and 5B, it is described as an example that, as a result of collecting the position information 126 through read requests to figure out the positions of the valid pages of the memory block B11, including a total of 4 valid pages, and the memory block B13, including a total of 3 valid pages, the processor 110 has completely collected the position information 126 for all valid pages P11, P12, P15 and P16 included in the memory block B11 and has collected the position information 126 for partial valid pages P31 and P39, among the valid pages included in the memory block B13.

Referring to FIG. 5A, when a memory block in which collection of position information for all valid pages has completed, the processor 110 may select the corresponding memory block as a victim block in a garbage collecting operation, and thereby acquire an empty block. The processor 110 may copy valid data D11, D12, D15 and D16 stored in all the valid pages P11, P12, P15 and P16 of the memory block B11, in a new position B15. Then, the processor 110 may erase the memory block B11.

Referring to FIG. 5B, for example, when the empty space of the memory 120 is not sufficient, the processor 110 may use and then remove the position information collected so far, to secure an empty space. The processor 110 may figure out valid pages P11, P12, P15, P16, P31 and P39 through the position information collected so far, and copy all valid data D11, D12, D15, D16, D31 and D39 in a new position B15. The processor 110 may process the pages P31 and P39 as invalid pages in the memory block B13, and change the valid page count of the memory block B13 to 1, to successively collect the position information for the valid page left in the memory block B13.

Figure 6:
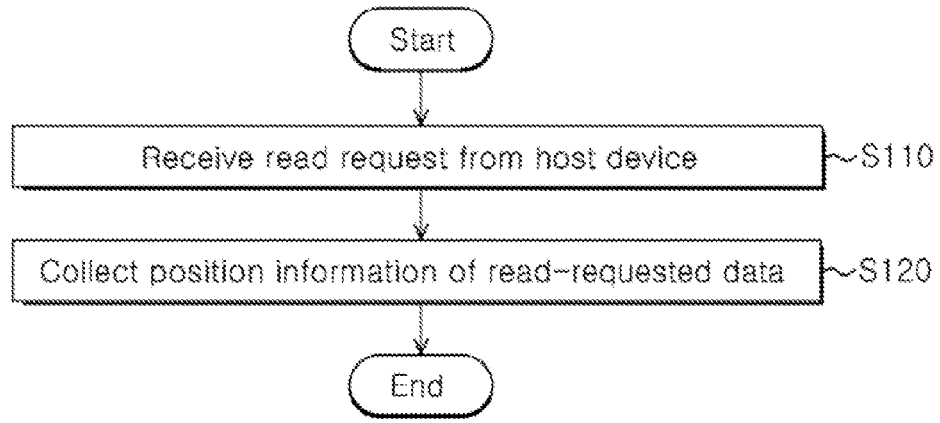
FIG. 6 is a flow chart to assist in the explanation of an operating method of the data storage device shown in FIG. 1.

FIG. 6 is a flow chart to assist in the explanation of an operating method of the data storage device 10 shown in FIG. 1.

At step S110, the processor 110 may receive a read request from the host device. The processor 110 may perform a read operation for the memory apparatus 200 in response to the read request.

At step S120, the processor 110 may separately collect the position information 126 of read-requested data, into the memory 120. The position information 126 of the read-requested data may indicate a position in the memory apparatus 200 where the read-requested data is stored. The position information 126 of the read-requested data may include the physical address mapped by the logical address included in the read request. The processor 110 may refer to the mapping information 122 in the form of an L2P mapping table, to identify the position information of the read-requested data.

Figure 7:
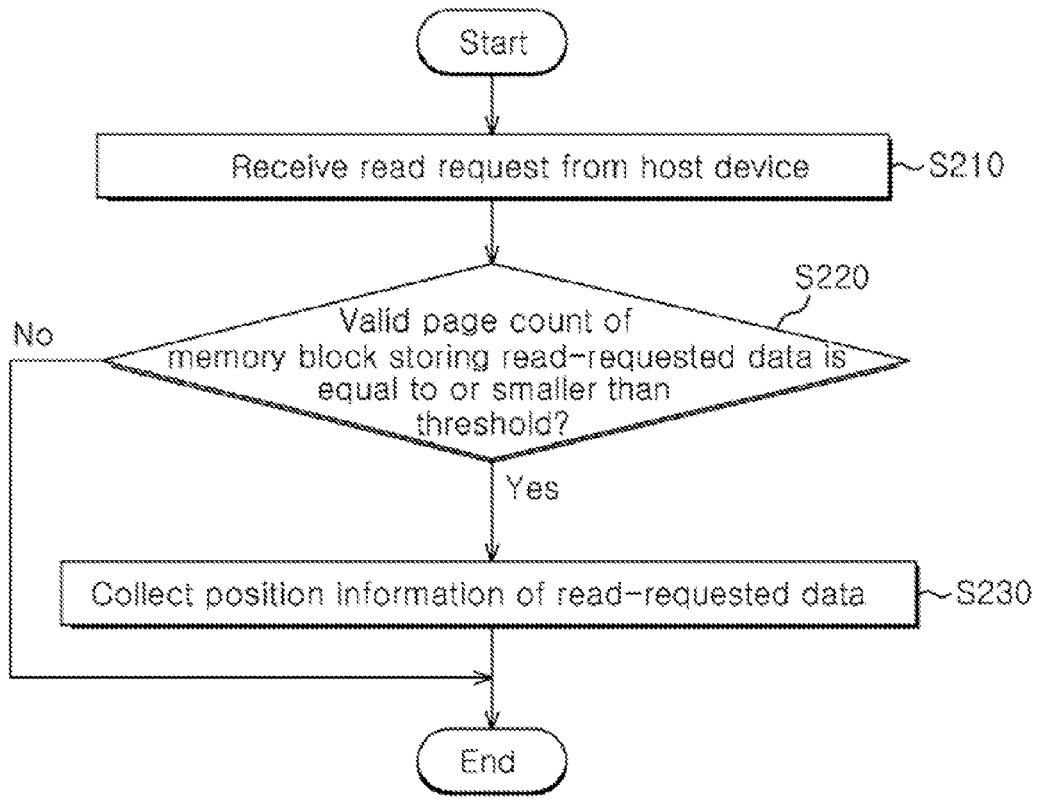
FIG. 7 is a flow chart to assist in the explanation of another operating method of the data storage device shown in FIG. 1.

FIG. 7 is a flow chart to assist in the explanation of another operating method of the data storage device 10 shown in FIG. 1.

At step S210, the processor 110 may receive a read request from the host device.

At step S220, the processor 110 may determine whether the valid page count of a memory block, which stores read-requested data, is equal to or smaller than a threshold. The processor 110 may check the valid page count of the memory block, which stores the read-requested data, by referring to the valid page count information 124. When the valid page count is equal to or smaller than the threshold, the process may proceed to step S230. When the valid page count exceeds the threshold, the process may end.

At step S230, the processor 110 may separately collect the position information of the read-requested data, into the memory 120.

Figure 8:
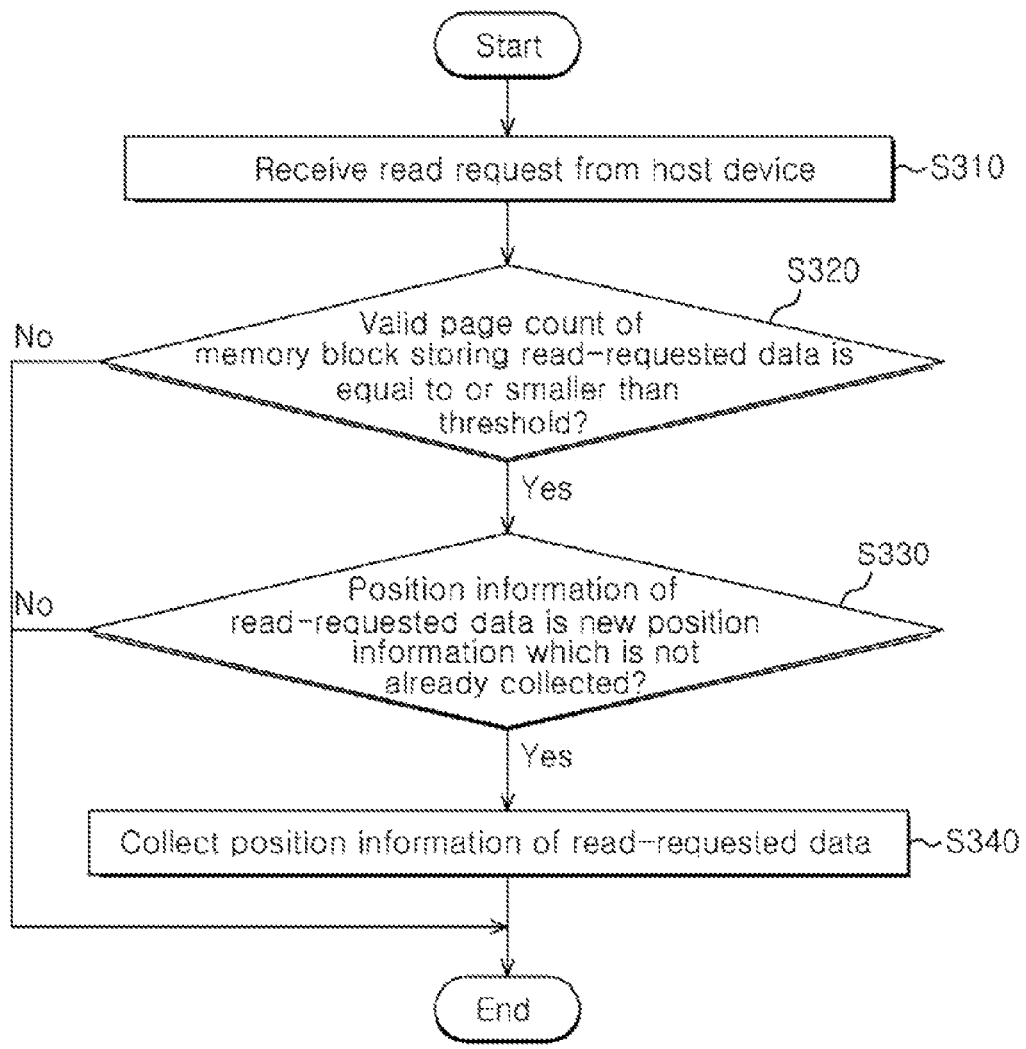
FIG. 8 is a flow chart to assist in the explanation of another operating method of the data storage device shown in FIG. 1.

FIG. 8 is a flow chart to assist in the explanation of another operating method of the data storage device 10 shown in FIG. 1.

At step S310, the processor 110 may receive a read request from the host device.

At step S320, the processor 110 may determine whether the valid page count of a memory block which stores read-requested data is equal to or smaller than a threshold. When the valid page count is equal to or smaller than the threshold, the process may proceed to step S330. When the valid page count exceeds the threshold, the process may end.

At step S330, the processor 110 may check whether the position information of the read-requested data is new position information that has not been collected already. In checking the position information, the processor 110 may compare already collected position information and the position information of the read-requested data. When the position information is new position information, the process may proceed to step S340. When the position information is not new position information, the process may end.

At step S340, the processor 110 may separately collect the position information of the read-requested data, into the memory 120.

Figure 9:
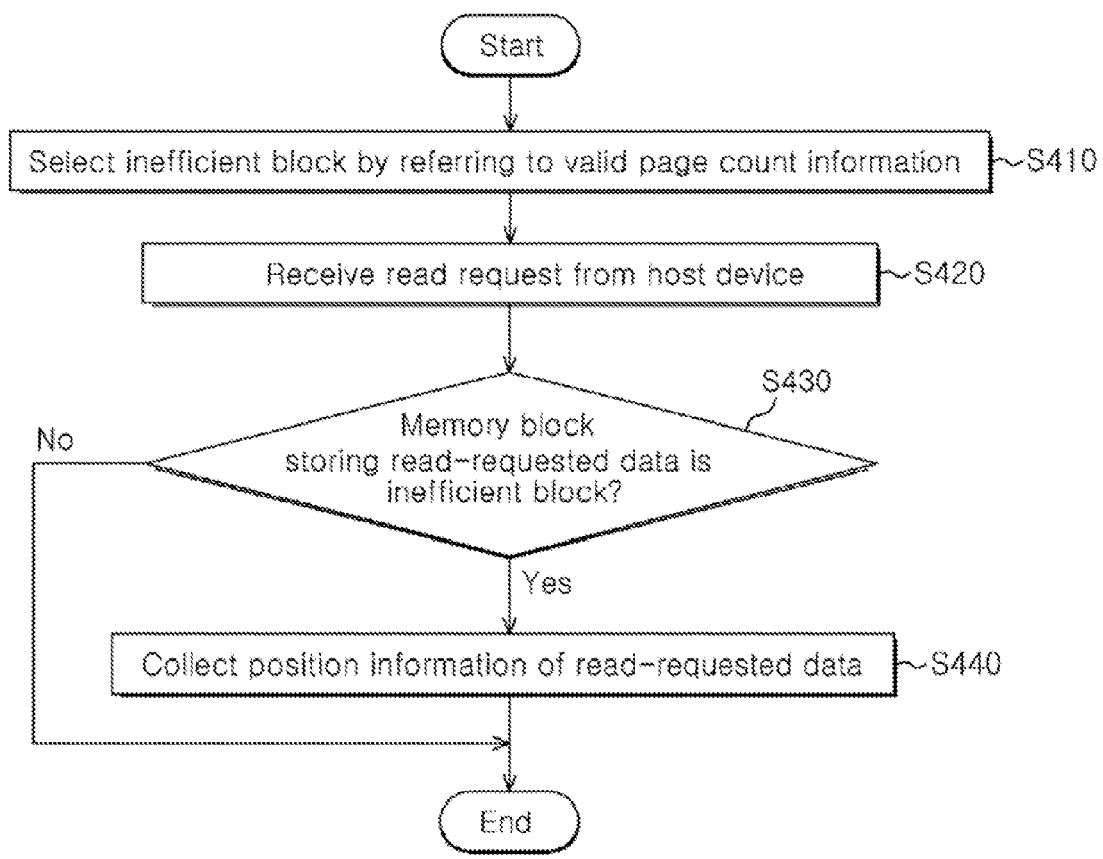
FIG. 9 is a flow chart to assist in the explanation of another operating method of the data storage device shown in FIG. 1.

FIG. 9 is a flow chart to assist in the explanation of another operating method of the data storage device 10 shown in FIG. 1.

At step S410, the processor 110 may select one or more inefficient blocks by referring to the valid page count information 124. The processor 110 may compare the respective valid page counts of memory blocks and a threshold, and select memory blocks with valid page counts that are equal to or smaller than the threshold, as inefficient blocks.

At step S420, the processor 110 may receive a read request from the host device.

At step S430, the processor 110 may determine whether a memory block that stores read-requested data is included in the selected inefficient blocks. When the memory block that stores the read-requested data is included in the selected inefficient blocks, the process may proceed to step S440. When the memory block that stores the read-requested data is not included in the selected inefficient blocks, the process may end.

At the step S440, the processor 110 may separately collect the position information of the read-requested data, into the memory 120.

Figure 10:
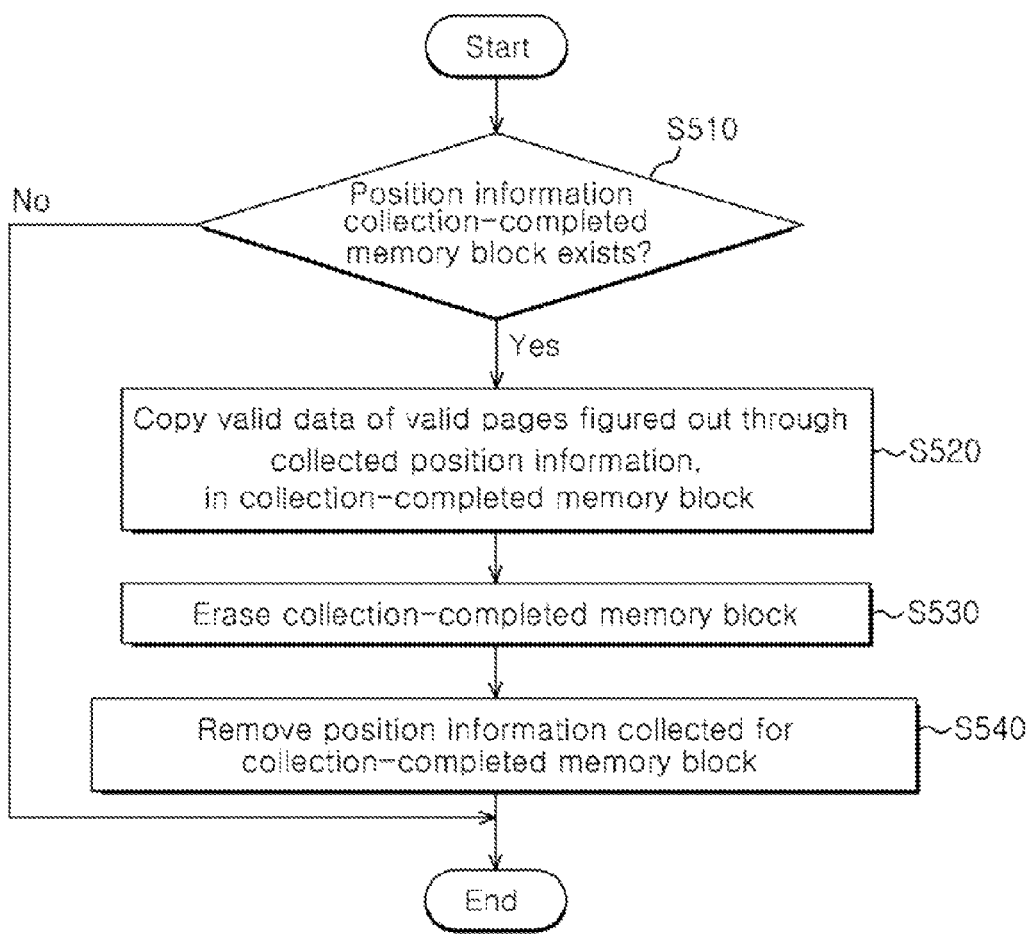
FIG. 10 is a flow chart to assist in the explanation of a method for the data storage device shown in FIG. 1 to utilize collected position information.

FIG. 10 is a flow chart to assist in the explanation of a method for the data storage device 10 shown in FIG. 1 to utilize collected position information.

At step S510, the processor 110 may check whether there is a memory block for which collection of position information is completed. In detail, the processor 110 may sort collected position information based on corresponding memory blocks, and count the numbers of position information collected for the respective memory blocks. When the counted number corresponds to the valid page count of a corresponding memory block, the processor 110 may determine that collection of position information for the corresponding memory block is completed. When there is a memory block for which collection of position information is completed, the process may proceed to step S520. When there is not a memory block for which collection of position information is completed, the process may end.

At step S520, the processor 110 may copy the valid data of the valid pages figured out through collected position information, from the memory block for which collection of position information is completed, into a new position.

At step S530, the processor 110 may erase the memory block for which collection of position information is completed. That is to say, the processor 110 may select the memory block for which collection of position information is completed, as a victim block, and perform a garbage collecting operation.

At step S540, the processor 110 may remove the position information collected for the memory block for which collection of position information is completed, from the memory 120. The processor 110 may remove the position information used among collected position information, from the memory 120.

Figure 11:
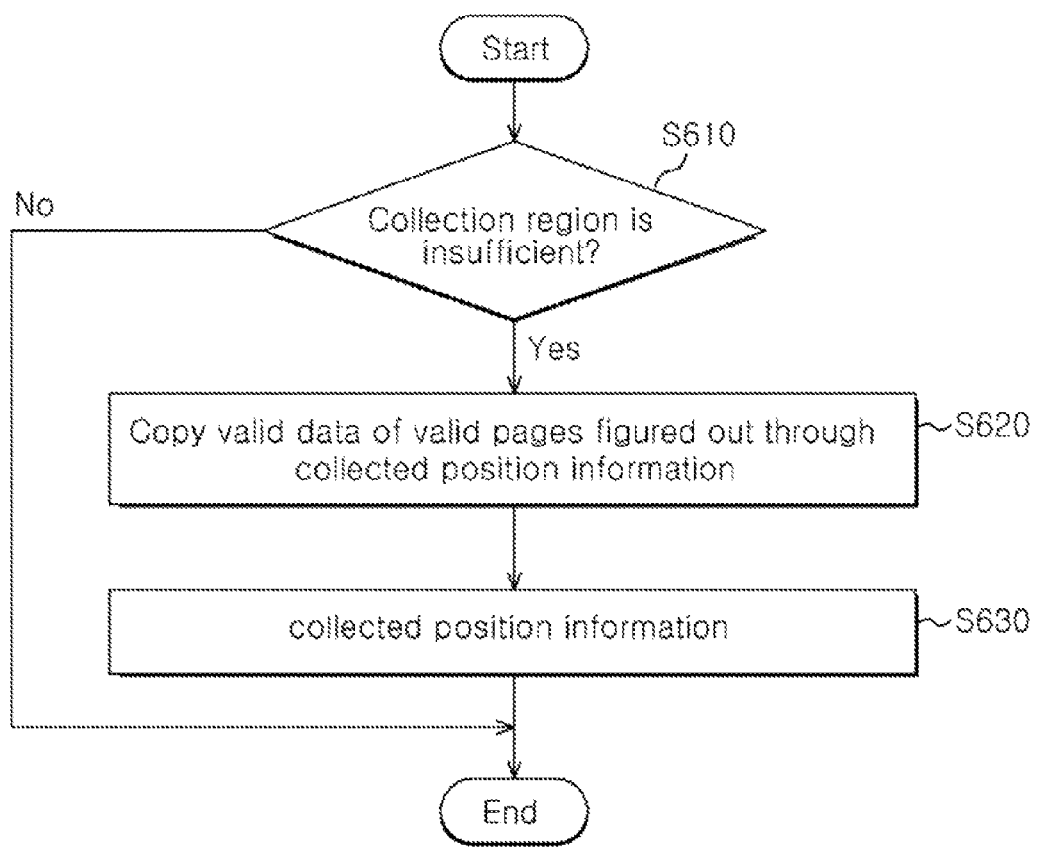
FIG. 11 is a flow chart to assist in the explanation of another method for the data storage device shown in FIG. 1 to utilize collected position information.

FIG. 11 is a flow chart to assist in the explanation of another method for the data storage device 10 shown in FIG. 1 to utilize collected position information.

At step S610, the processor 110 may determine whether a collecting region for storing collected position information is insufficient. For example, the processor 110 may count the total number of collected position information, and may determine that a collecting region is insufficient when the counted total number reaches a predetermined value. When a collecting region is insufficient, the process may proceed to step S620. When a collecting region is sufficient, the process may end.

At the step S620, the processor 110 may copy the valid data of the valid pages figured out through all collected position information, in a new position.

At step S630, the processor 110 may remove all collected position information from the memory 120.

While various embodiments have been described above, it will be understood to those skilled in the art that the embodiments described are examples only. Accordingly, the data storage device and the operating method thereof described herein should not be limited based on the described embodiments.

What is claimed is:

1. An operating method of a data storage device, comprising:
    receiving a read request from a host device;
    selectively collecting position information of read-requested data in a collecting region, the collecting region not storing position information of data which has not been read-requested; and
    removing position information used in a garbage collecting operation from the collecting region.

2. The operating method according to claim 1, wherein the position information includes a physical address that is mapped by a logical address included in the read request.

3. The operating method according to claim 1, wherein the collecting of the position information comprises:
    comparing a valid page count of a memory block, which stores the read-requested data, and a threshold; and
    determining whether to collect the position information based on a comparison result.

4. The operating method according to claim 3, wherein the position information is collected when the valid page count of the memory block is equal to or smaller than the threshold and not collected when the valid page count of the memory block is larger than the threshold.

5. The operating method according to claim 1, further comprising:
    comparing valid page counts of respective memory blocks and a threshold; and
    selecting one or more inefficient blocks based on comparison results among the memory blocks.

6. The operating method according to claim 5, wherein the collecting of the position information comprises:
    determining whether a memory block that stores the read-requested data is included in the one or more inefficient blocks; and
    determining whether to collect the position information based on a determination result.

7. The operating method according to claim 1, further comprising:
    copying the read-requested data in a new position in the garbage collection operation, based on collected position information.

8. An operating method of a data storage device, comprising:
    separately collecting position information of data read-requested from a host device in a collecting region, the collecting region not storing position information of data which has not been read-requested; and
    performing a garbage collecting operation, based on collected position information in the collecting region.

9. The operating method according to claim 8, wherein the position information includes a physical address which is mapped in a logical address included in a read request.

10. The operating method according to claim 8, further comprising, after the collecting of the position information:
    sorting the collected position information based on corresponding memory blocks.

11. The operating method according to claim 8, wherein the performing of the garbage collecting operation comprises:
    selecting a victim block;
    finding a valid page in the victim block through the collected position information; and
    copying valid data of the valid pages, in a new position.

12. The operating method according to claim 11, wherein the victim block is a memory block with completed collection of position information.

13. The operating method according to claim 11, wherein the victim block is a memory block with a valid page count that is less than or equal to a threshold.

14. The operating method according to claim 8, the performing of the garbage collecting operation comprising:
    copying valid data of valid pages that is determined through the collected position information, in a new position, when a total number of the collected position information reaches a predetermined value.

15. A data storage device comprising:
    a nonvolatile memory apparatus including a plurality of memory blocks; and
    a controller suitable for selectively collecting position information of data read-requested from an external device in a collecting region, the collecting region not storing position information of data which has not been read-requested.

16. The data storage device according to claim 15, wherein the controller collects a physical address that is mapped by a logical address included in a read request, as the position information.

17. The data storage device according to claim 15, wherein the controller collects the position information when a valid page count of a memory block that stores read-requested data among the memory blocks is less than or equal to a threshold.

18. The data storage device according to claim 15, wherein the controller selects a memory block with a valid page count, which is less than or equal to a threshold among the memory blocks, as an inefficient block.

19. The data storage device according to claim 18, wherein the controller collects the position information when a memory block that stores read-requested data among the memory blocks is the inefficient block.

20. The data storage device according to claim 15, wherein the controller performs a garbage collecting operation on a memory block with completed collection of position information among the memory blocks, based on collected position information.

* * * * *